Figures 1, 2:
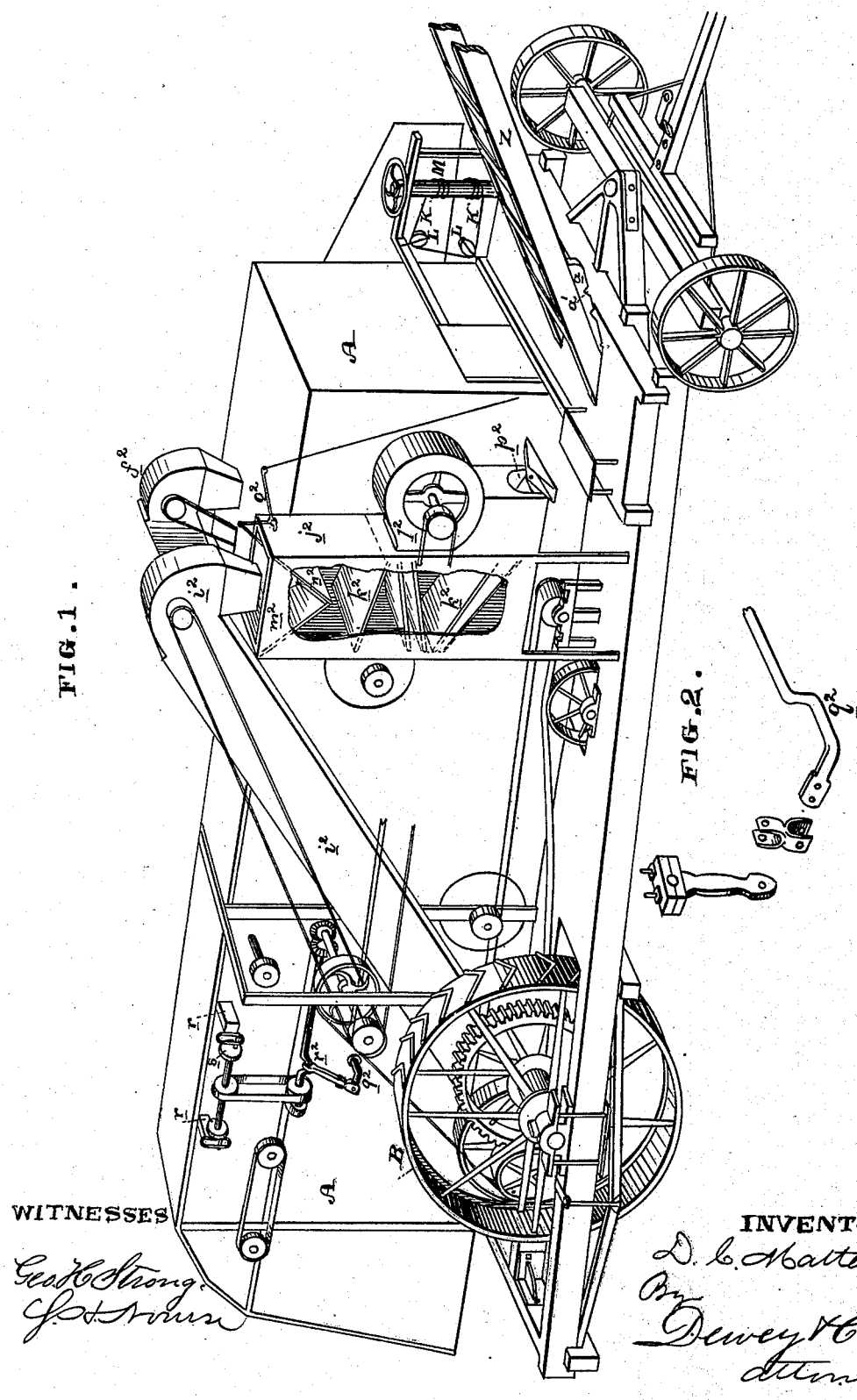

(No Model.)

D. C. MATTESON.
THRASHER AND SEPARATOR.

No. 322,118. Patented July 14, 1885.

WITNESSES
Geo. H. Strong.

INVENTOR
D. C. Matteson
By Dewey & Co.
Attorneys

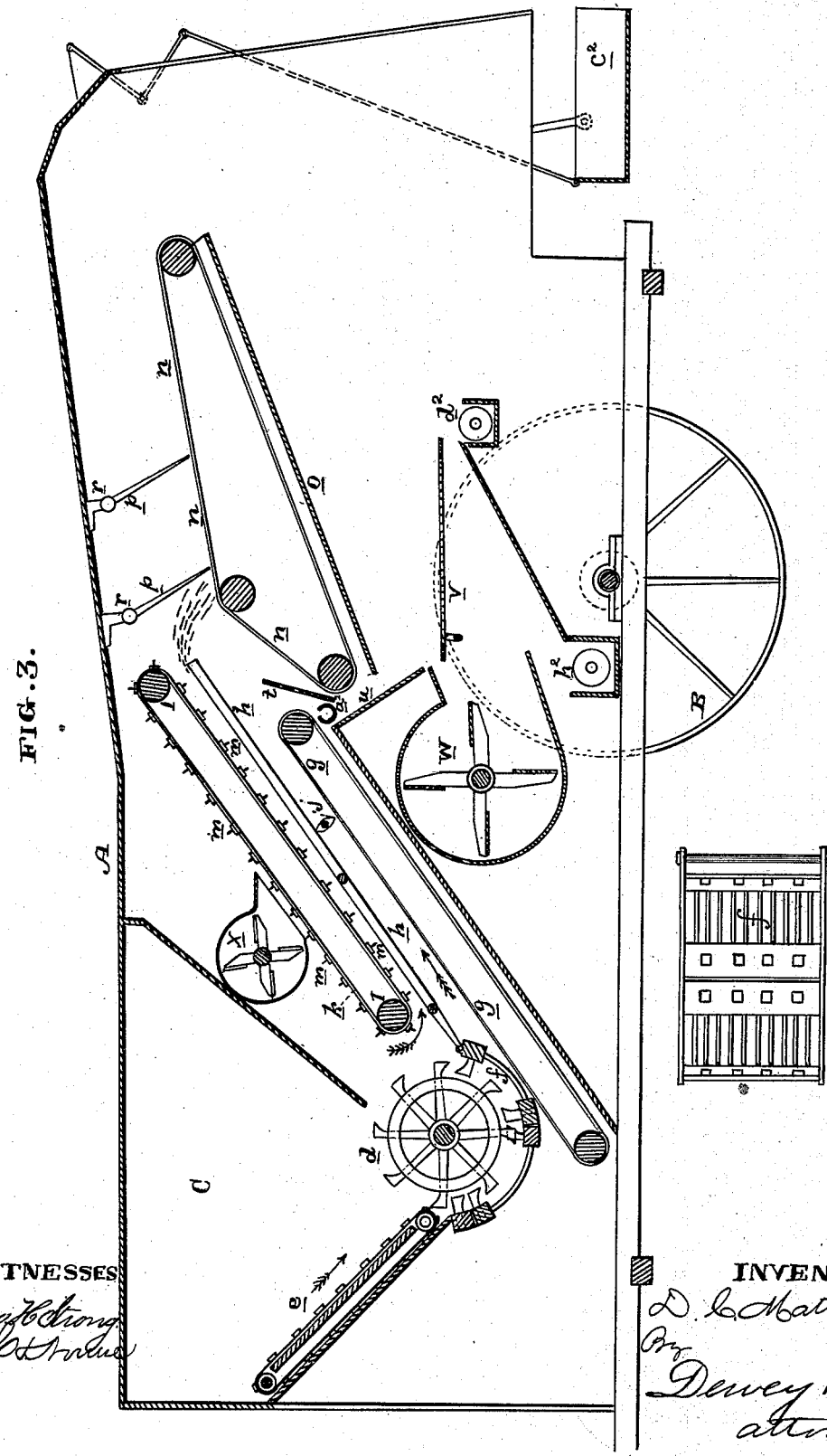

(No Model.) 3 Sheets—Sheet 3.
D. C. MATTESON.
THRASHER AND SEPARATOR.
No. 322,118. Patented July 14, 1885.
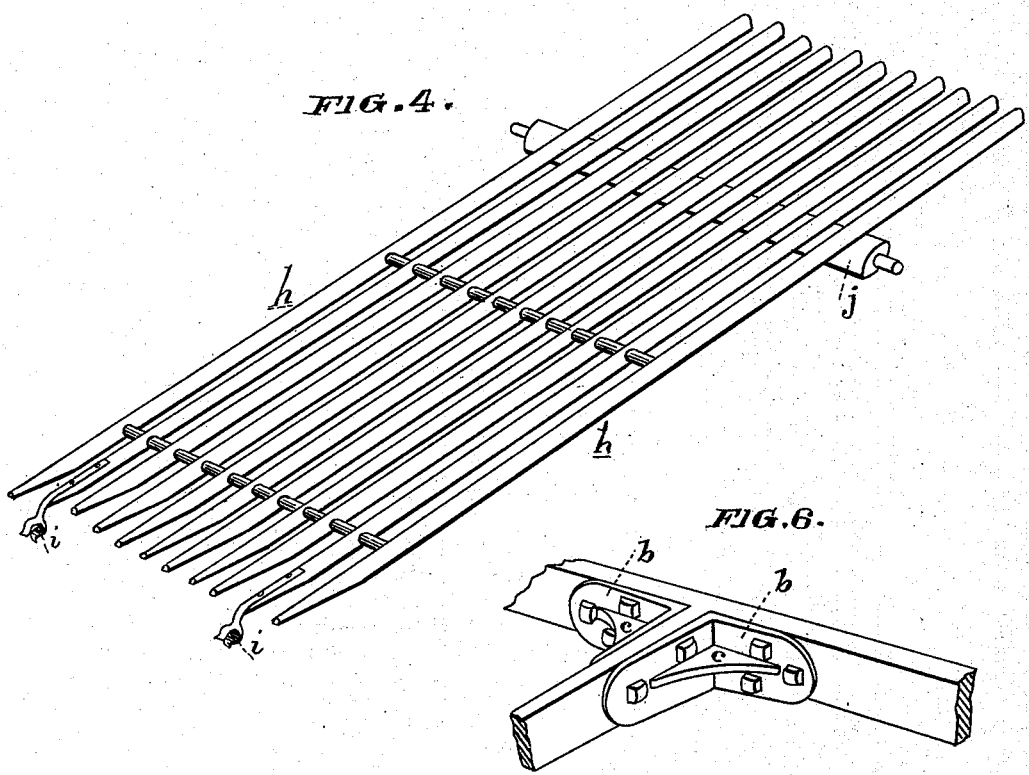
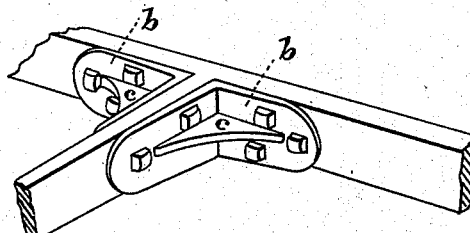
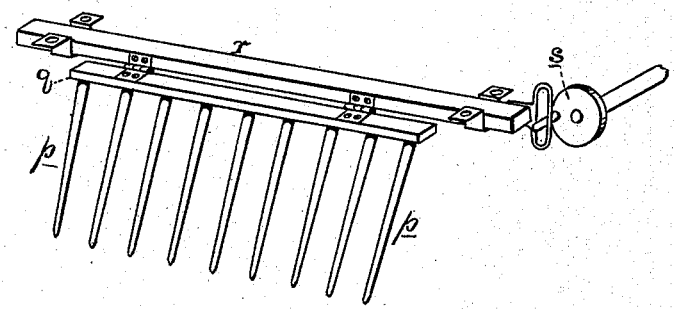
WITNESSES
Geo H Strong
INVENTOR
D. C. Matteson
By Dewey & Co.
Attorneys

UNITED STATES PATENT OFFICE.

DON C. MATTESON, OF STOCKTON, CALIFORNIA.

THRASHER AND SEPARATOR.

SPECIFICATION forming part of Letters Patent No. 322,118, dated July 14, 1885.

Application filed January 15, 1885. (No model.)

*To all whom it may concern:*

Be it known that I, DON C. MATTESON, of Stockton, county of San Joaquin, State of California, have invented an Improvement in Thrashers and Separators; and I hereby declare the following to be a full, clear, and exact description of the same.

My invention relates to certain improvements in apparatus for thrashing, separating, and cleaning grain; and it consists, mainly, in novel devices for transporting the grain and straw from the thrashing-cylinder and separating them from each other, and also in appliances for more perfectly separating the grain from the chaff and other impurities with which it may be charged, all of which will be more fully explained by reference to the accompanying drawings, in which—

Figure 1, Sheet 1, is a perspective exterior view of my apparatus, showing the mechanism for actuating the rakes and cleaning-shoe, also the secondary cleaner. Fig. 2 is an enlarged view of the mechanism for producing the end shake of the cleaning-shoe. Fig. 3, Sheet 2, is a longitudinal vertical section of the thrashing and separating mechanism. Fig. 4, Sheet 3, is an enlarged perspective view of the straw supporting and carrying rack. Fig. 5 is an enlarged view of one of the rakes. Fig. 6 shows the angle-braces.

A is the body or case of a thrashing-machine and separator, and B are the main bearing-wheels, from which power to drive the machinery is derived when the apparatus is connected with a header and travels about the field. When the machine is designed to remain stationary while at work, power may be communicated to it in the usual or any suitable manner.

C is a hopper-shaped receptacle above the thrashing-cylinder, and into this the straw to be thrashed is delivered either from the carrying-belt of the header when the two are united, or by any of the well-known methods for feeding to stationary thrashers.

The grain is delivered into the top or side of the case A, so as to pass downward to the thrashing-cylinder $d$. In order to deliver it regularly and prevent clogging, I employ a carrying belt or feeder, $e$, which stands at an incline upon the front of and inside the hopper, moving in the direction shown by the arrow in Fig. 3, so as to deliver the grain downward upon the cylinder, this feeder being supplemental to any exterior feeder which may be used. The concave $f$ of the cylinder is made open or like a fine grating, as shown, so that the grain as it is thrashed will be discharged through it upon a closed carrying-belt, $g$, which moves upward, carrying the grain to the point where it is to be discharged over the upper drum or roller and into a cleaning-shoe. Above this grain-belt is a rack, screen, or straw-support, $h$, which is composed of longitudinal strips or slats, as plainly shown in Fig. 4. The lower end of this rack or screen is hinged to or near the rear of the concave by open elastic clips $i$, which are so formed that they may be sprung apart and slipped over the permanent hinge-rod, where they will hold the rack, but will allow it to be drawn out in the direction of its length by springing apart, so that the hinge-rod need not be removed. The upper end of this rack or screen is given a tossing or vibratory motion by means of a cam-shaft, $j$, which passes beneath it and is caused to rotate by any suitable pulley-connection with the driving mechanism. In order to cause the straw to travel upward along this screen while it is being thus agitated, I employ a revolving rake, which consists of a belt, $k$, passing around pulleys $l$, which support its lower surface parallel with and near to the rack H. Upon this belt are fixed transverse slats with projecting points or teeth $m$, and these points or teeth act upon the straw and carry it upward in the line of the screen upon which it is discharged from the cylinder. From the upper end of this screen the straw passes upon the straw-carrying belt $n$, and is by this belt carried outward to the point of discharge at the rear end of the machine. In order to still further separate and loosen up the straw, so as to allow any remaining particles of grain which may be entangled with it to fall through the belt upon the inclined returning-board, I employ the transverse rakes $p$. These rakes consist of long teeth projecting downward to near the straw-carrying belt $n$, their upper ends being secured in the upper heads, $q$, which are hinged to bars $r$, as shown in Fig. 5. These rakes and the bars to which they are hinged extend transversely across the machine just above the open straw-carrying belt $n$, and the bars $r$ are connected in any suitable manner with a cam or crank wheel, $s$, by which they are driven, as shown in Figs. 1 and 5. The crank-wheels are so set that the rakes reciprocate across the line of the moving straw and in opposite directions to each other. The effect of this action is to tear the straw apart, while at the same time keeping it closely upon the belt, so that it is loosened and any grain in it allowed to fall through. As the rakes $p$ are hinged to the bars, it will be seen that any masses of straw which are too large to pass under them readily will raise them up about their hinges until it is allowed to escape, and it will be torn apart and loosened meanwhile, so as to discharge any grain which may be held in it. The grain itself, passing up the carrying-belt $g$, as before described, is discharged over the upper end, guided by the inclined board $t$, and falls upon the directing-board $u$, which delivers it upon the upper screen of the cleaning-shoe $v$, where it is acted upon in the usual manner by a blast from the fan $w$.

In order to assist in driving the grain out of the straw which is being carried up the inclined rack $h$, I employ a supplemental fan, $x$, which is placed just behind the hopper through which the unthrashed straw is delivered to the the cylinder and just forward of the traveling rake $m$. This fan is so placed as to discharge the air through the traveling rake $m$ and the rack $h$, striking the upper end of the grain-belt $g$, which deflects the air upward and backward and assists to toss and loosen the straw as it passes over the upper end of the rack $h$. Just beneath the upper roller over which the grain-belt $g$ passes is a tube, $a^2$, the upper side of which is perforated with holes, which allow jets of air to pass upward through the falling grain and chaff. This tends to throw the chaff upward over the board $t$, where it will be caught by the straw-belt $n$ and carried outward with the rest of the straw. This tube $a^2$ is supplied with air by a small blower of any suitable pattern, this blower being conveniently fixed to the separator-case A, and driven by a belt over a pulley from any convenient portion of the driving apparatus. By these means the straw is kept constantly agitated and loosened from the time it leaves the cylinder until it is discharged from the rear of the machine, and grain which may be entangled is thus very thoroughly separated, while much of the chaff which falls over the upper end of the grain-belt $g$ is separated from the falling grain by the air-blast from the tube $a^2$.

$c^2$ is a box or receptacle at the rear end of the apparatus, into which the straw falls when it is discharged, and from which it may be conveniently loaded upon wagons from time to time.

$d^2$ is the conveyer, which carries the unthrashed heads and partially-cleaned grain to an elevator, $f^2$, at one side of the machine, which returns it again to pass through the thrasher-cylinder.

$h^2$ is the conveyer, which delivers the cleaned grain from the shoe into an elevator, $i^2$, which carries it upward and delivers it into a secondary cleaner, $j^2$. This cleaner is fixed to the side of the casing A of the thrasher, and has a series of separating screens and riddles, $k^2$, as shown in Fig. 1, with the fan-blower $l^2$, which supplies the blast for cleaning purposes, this particular device not being essentially different from what has been already constructed. The difficulty with this class of cleaners is that when the machine is running slowly, while turning corners or for other purposes, there is not sufficient speed to produce the necessary blast to perfectly clean the grain, and a great deal of dirt passes through the cleaner and into the sacks.

In my invention I provide a hopper, $m^2$, into which the grain is discharged from the elevator $i^2$, and this hopper has a gate, $n^2$, with connecting-levers $o^2$, and a handle which extends down to a point within reach of the operator who attends to the sacking of the grain at the discharge $p^2$. Whenever the machine is running to slowly too thoroughly clean the grain, the operator closes the gate $n^2$, thus preventing any grain from passing over the screens while the machine is running slowly, and as soon as it can accumulate sufficient speed the gate $n^2$ is opened and the grain allowed to pass over the screens. The end shake of the primary cleaning-shoe $v$ is produced by means of a crank-lever, $q^2$, which is connected with it inside of the separator, and its outer end forms a crank-arm at right angles with the interior portion. This is caused to vibrate or oscillate by means of a crank-shaft, $r^2$, outside of the machine, the details of which connection are shown in Figs. 1 and 2. In this class of apparatus the frame is necessarily very large, and in passing over irregular ground the tendency is to twist and wring it out of shape, which so deranges the journal-boxes that the friction upon the shafts is sometimes very great and it requires a large proportion of the driving-power to overcome this friction. In order to stiffen the frame as much as possible and prevent this twisting, I fit angle-irons $b$ on the inside of each of the joints where the timbers meet each other, as shown in Fig. 6. These irons may be of considerable depth and are bolted to each of the meeting timbers, and they have a web, $c$, extending across from one to the other so as to form a brace to prevent their being broken at the angles by the strain which may come upon them. It will be manifest that these corner-irons may be employed upon harvester or other frames which are designed to travel while at work, but which from their size may be strained while being moved from place to place, and which may not always be set on even ground.

Having thus described my invention, what I claim as new, and desire to secure by Letters Patent, is—

1. The thrasher cylinder and concave, the straw-supporting screen-frame extending upward and backward therefrom, the superposed traveling belt-rake, and a grain-carrying belt below the screen, in combination with the blast apparatus or fan X, placed above the traveling belt-rake so as to discharge through it and the screen upon the upper end of the grain-belt, substantially as herein described.

2. The combination, with the hinge-rod, of the straw-supporting frame or screen composed of longitudinal strips and having the open-ended spring-loops $i$, whereby it may be connected to the hinge-rod or removed therefrom without withdrawing the rod, substantially as herein described.

3. The straw-carrier $n$, in combination with rakes $p$, hinged to swing longitudinally of the carrier and arranged to drop toward the carrier with their ends in proximity thereto, and a mechanism for causing the rakes to reciprocate laterally across the carrier, substantially as described.

4. The combination of the thrasher cylinder and concave, means for carrying the straw upward and backward therefrom, the primary cleaning-shoe, a grain-belt below by which the grain is carried upward and backward and delivered over the upper end of the primary cleaning-shoe, and the transverse perforated blast-pipe placed below the upper end of the grain-belt, substantially as herein described.

In witness whereof I have hereunto set my hand.

DON C. MATTESON.

Witnesses:
WILLARD T. JONES,
A. F. HILLMAN.